United States Patent [19]
Harbison et al.

[11] 3,883,920
[45] May 20, 1975

[54] BRIDGE TO LINK CONNECTION

[75] Inventors: William H. Harbison, Merrillville; John J. Plisky, Munster; Michael G. Mohnach, Merrillville, all of Ind.

[73] Assignee: The Anderson Company, Gary, Ind.

[22] Filed: Mar. 18, 1974

[21] Appl. No.: 451,751

[52] U.S. Cl. ............................................ 15/250.42
[51] Int. Cl. ............................................... B60s 1/38
[58] Field of Search ....... 15/250.35, 250.36, 250.32, 15/250.38, 250.42

[56] References Cited
UNITED STATES PATENTS

| | | | |
|---|---|---|---|
| 2,955,313 | 10/1960 | Anderson | 15/250.42 |
| 3,094,734 | 6/1963 | Hoyler | 15/250.42 |
| 3,405,421 | 10/1968 | Tomlin | 15/250.42 |
| 3,414,931 | 12/1968 | Kodama | 15/250.42 |
| 3,629,898 | 12/1971 | Plisky | 15/250.42 |
| 3,772,730 | 11/1973 | Plisky | 15/250.42 |

FOREIGN PATENTS OR APPLICATIONS

| | | | |
|---|---|---|---|
| 935,460 | 8/1963 | United Kingdom | 15/250.42 |

*Primary Examiner*—Peter Feldman
*Attorney, Agent, or Firm*—Wegner, Stellman, McCord, Wiles & Wood

[57] ABSTRACT

A wiper blade is provided with a primary bridge formed of metal or metal-like material and is pivotally connected at one end to at least one secondary yoke formed of plastic or plastic-like material with the secondary yoke slidably connected at at least one end portion to a wiper blade member for wiping a windshield. The metal-to-plastic connection affords a quiet junction which is easily and quickly disconnected and is relatively friction free during articulation.

4 Claims, 8 Drawing Figures

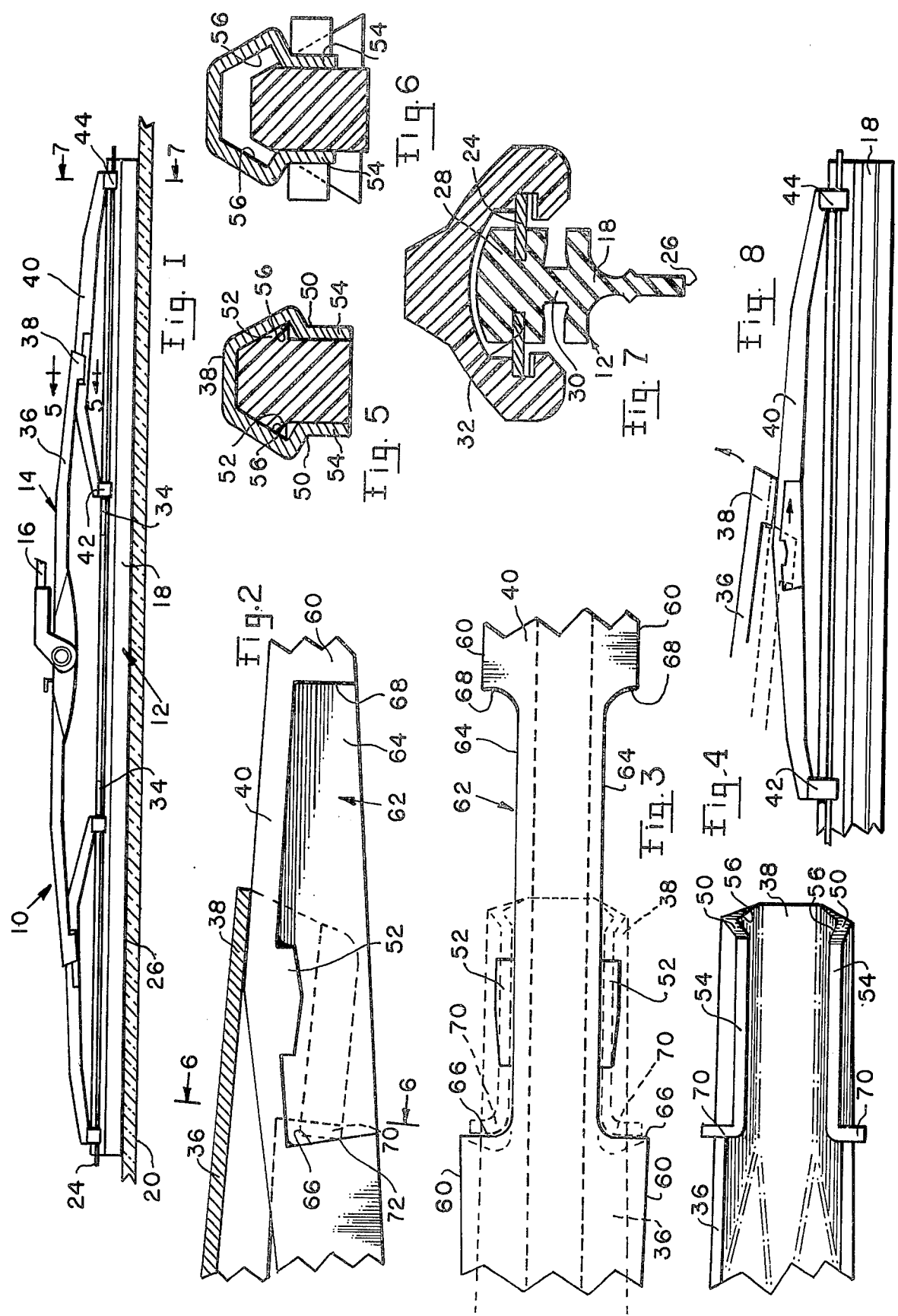

BRIDGE TO LINK CONNECTION

BACKGROUND OF THE INVENTION

1 FIELD OF THE INVENTION

This invention relates to a windshield wiper arm and blade assembly and, more particularly, to a construction whereby a primary yoke or bridge member is formed of one material and is easily and quickly connected to a secondary yoke formed of a contrasing material in a noiseless and easily disconnected manner.

2. DESCRIPTION OF THE PRIOR ART

For many years, windshield wiper blades have included primary and secondary yoke members made all of one material, i.e., all metal and/or all plastic, and were pivotally connected together to afford relative movement in a plane substantially perpendicular to a windshield being wiped and to resist bending or twisting relative to each other in a plane substantially parallel to said windshield.

Blades of the all metal construction have been found to produce clicking or comparable contact-type noises during movement of the wiper blade back and forth across the windshield. That is, at the point of connection between the primary and secondary yokes, somewhat loose fit is required to permit free articulation in the directions intended, which relatively loose connection permits a certain amount of play that causes metal-to-metal noise between the two yokes upon reversal of the direction of movement of the blade on the windshield. In some blades the connection of the claws of the metal secondary yokes to the metal backing strip also produced metal-to-metal noise during use in wiping a windshield.

On the other hand, blades made with plastic-type material have either been all one-piece molded members which have resulted in fatigue failure at the junction between the primary and secondary yokes or have had pin-type connections such that the pins wore during use to permit excessive play between the members.

In either the all metal or all plastic blades, the connections between the primary and secondary yokes were relatively complicated. That is, the connections required latches and springs or the like, or were riveted in position further addition to the cost and complexity of the blade.

SUMMARY OF THE INVENTION

To overcome the problems enumerated above, it has been discovered that a blade which, in its perferred form, has a metal bridge member or primary yoke pivotally connected at at least one end portion to a plastic secondary yoke member substantially eliminates the noise generated between the primary and secondary yokes and yet provides the stability of metal in the primary yoke and the flexibility of plastic in the secondary yoke. The secondary yoke slides relatively freely on the metal or plastic backing strip of the wiper blade so that, once again, noise between the secondary yoke and the backing strip are eliminated. The plastic material is of such a nature as to be relatively friction free in its movement with respect to the backing strip.

The connection between the primary yoke and the secondary yoke is a latchless-type connection so that the primary yoke is slidably brought into assembly with the secondary yoke in such a way that the two yokes are relatively friction free in movement relative to each other and yet have a firm controlled retained arrangement therebetween. To connect or disconnect the primary and secondary yokes, it is a relatively simple matter to reverse bend the wiper blade in a bow shape so that the one end of the primary yoke can be moved horizontally with respect to the connection with the secondary yoke until the overhang on the sides of the primary yoke align with an undercut in the secondary yoke whereupon the primary yoke can be lifted from the secondary yoke to disconnect the two.

The resulting blade is a quiet, stable, quickly connected and disconnected structure producing an improved blade having a highly efficient assembly in use.

DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a triple yoke superstructure and wiper blade element assembled together and incorporating the features of our invention;

FIG. 2 is an enlarged side view of that portion of the wiper blade assembly of FIG. 1 showing the end portion of the primary yoke assembled with the secondary yoke;

FIG. 3 is a top plane view of the assembly of FIG. 2 showing the end of the primary yoke in dotted lines;

FIG. 4 is a bottom plane view of the one end portion of the primary yoke of FIG. 2 with the secondary yoke removed;

FIG. 5 is an enlarged cross-sectional view taken along the lines 5—5 of FIG. 1;

FIG. 6 is an enlarged cross-sectional view taken along the lines 6—6 of FIG. 2;

FIG. 7 is an enlarged cross-sectional view taken along the lines 7—7 of FIG. 1; and, FIG. 8 is a slightly enlarged view of the end portion of the wiper blade assembly of FIG. 1 showing the primary yoke disassembled from the secondary yoke and with the same primary yoke in assembled position with the secondary yoke shown in phantom.

DESCRIPTION OF A PREFERRED EMBODIMENT

Referring to the drawings wherein similar reference numerals refer to similar parts throughout the several views, the windshield wiper blade assembly 10 comprises a wiper blade element 12 and an articulated pressure distributing superstructure 14 which receives pressure from a wiper arm 16. The pressure from the wiper arm 16 is transmitted through the elements of the superstructure to the wiper blade element 12 for conforming a resilient wiping member 18 of the wiper blade element 12 to the surface of the windshield 20 whereby movement of the arm 16 and windshield wiper blade assembly 10 across the surface of the windshield will wipe the desired area of the windshield.

The wiper blade element 12 is comprised of the resilient wiping member or squeegee 18 and the flexible support member, backing strip or flexor 24. The resilient wiping member 18 has a wiping edge 26 and an enlarged head portion 28 joined together by a hinge 30. The head portion 28 has a pair of mating grooves 32 formed inwardly from the opposite sides thereof. A pair of outwardly projecting abutments 34 are formed on the head portion 28 of the wiping member 18 in longitudinally spaced apart relationship. The flexible support member or flexor 24 is an elongate planar member of appropriate metal or plastic material and is of conventional construction and seats in said grooves 32 in the wiping member.

The pressure distributing superstructure 14 comprises a primary pressure distributing yoke or bridge member 36 formed of metal material and which bridge member is connected at one end portion 38 to at least one secondary pressure distributing yoke or bridge member 40 formed of plastic material. As shown, two plastic secondary yokes 40 are provided with one connected to each end of the primary yoke 36. Each secondary yoke 40 has two pairs of inwardly projecting claws 42,44 formed on the inboard and outboard end portions thereof, respectively, which claws 42,44 are designed to slidably engage with the exposed edge portions of the support member of flexor 24 at spaced apart locations thereon. The inboard claw 42 on each secondary yoke is slidably positioned in juxtaposed relationship to one abutment 34 with the outboard claw 44 of said yoke slidably engaging with the outer end portion of the support member or flexor 24.

Each secondary yoke 40 has an intermediate portion 62 to which one end portion 38 of the primary yoke 36 is removably attached for articulated movement of said primary yoke 36 relative to said secondary yoke 40. Each end portion 38 of said primary yoke 36 is shaped in cross section to conform generally to the cross-sectional shape of the underlying portion of the secondary yoke 40.

The primary yoke 36 which is made of metal is connected to a pair of secondary yokes 40 which are made of plastic material, by means of a pair of inturned flanges or claws 50 on each end of the primary yoke 36 engaging with and overlapping a pair of oppositely projecting lugs 52 formed in the intermediate portion 62 of each secondary yoke 40.

Specifically, each end of the metal primary yoke 36 has the pair of inturned flanges or claws 50 formed by downwardly depending, inwardly converging and partially parallel spaced apart side walls 54. The spaced apart side walls 54 define a pair of aligned slots 56 with the top wall of the primary yoke, each said slot 56 being open at each end.

Each side of each plastic secondary yoke 40 has an elongate lateral edge portion 60 cut in at an intermediate portion 62 thereof to form a pair of spaced apart, parallel side walls 64 from which the oppositely and outwardly projecting lugs 52 extend. The side walls 64 of the intermediate portion are bound on each end by projecting portions to form abutments 66,68 inboard and outboard, respectively, thereof. Abutments 66 are spaced from the lugs 52 an amount somewhat less than the axial length of the flanges or claws 50 of the primary yoke 36. The abutments 68 are spaced from the other end of the lugs 52 an amount equal to a little more than the axial length of the flanges or claws 50 of the metal primary yoke 36 to form an entry opening so that the flanges or claws 50 can span the distance between the side walls 64 of the secondary yoke and drop down between the lugs 52 and the abutments 68 until the slots 56 in the flanges or claws 50 align with the lugs 52 whereupon the metal primary yoke 36 is moved axially inward toward and into pivoting relation with the lugs 52 on the plastic secondary yoke 40. The inner edge of each side wall 54 of the flange or claw 50 of the primary yoke 36 has an outturned edge or lug 70 so that as the primary yoke 36 is articulated about the lugs 52, the bottom edge 72 of said lugs 70 may make a line contact with abutment 66 as the metal primary and plastic secondary yokes pivot relative to each other.

The claws 50 on one end 38 of the primary yoke 36 are manipulated, as described above, with the side walls 54 bridging the reduced dimensioned entry portion of one secondary yoke 40 and when the slots 56 are aligned with the lugs 52 it is moved inboard to engage the lugs 52 into articulating relation with the slots 56 in the flanges or claws of the primary yoke. The secondary yokes 40 are both threaded onto the flexor 24 from the opposite ends and are urged toward the middle of the wiper blade element 12 to compress the central portion of the resilient wiping member between the abutments 34 until the flanges or claws 50 on the other end of the primary yoke 36 align with the entry opening between the lugs 52 and the abutments 68 on the other secondary yoke 40 whereupon the claws 50 are dropped down through the entry opening and the slots 56 are aligned with the lugs 52. The inboard pressure on the secondary yokes 40 is now released and the resilience of the rubber element 18 urges the secondary yokes 40 into assembled relation with the ends of the primary yoke ready for use in wiping a windshield.

The distance between the outboard edges of the abutments 34 plus the distances between the contact of the inboard claws 42 of the secondary yokes 40 with the abutments 34 and the abutments 66 of each of the secondary yokes should be just about equal or be slightly less than the distance between the abutting edges 72 of the claws 50 of the primary yoke when the resilient wiping element 18 is in a substantially straight condition. In that way, the claws 50 at the ends of the primary yoke 36 cannot readily or accidentally become disengaged from the secondary yokes. To disassemble the superstructure from a wiper blade element requires positive manipulation of the parts to compress a portion of the resilient wiping member so that the primary yoke can be disassembled from one secondary yoke thereby permitting rapid disassembly and replacement of the wiper blade element 12.

In practice, with the primary yoke 36 formed of a metal material, such as stainless steel or the like, all of the inherent advantages of metal are retained for receiving pressure from the wiper arm and transmitting said pressure to the opposite ends thereof. The secondary yokes 40 being formed of one of the reinforced plastic-type materials, such as glass-filled Nylon (T.M.) or the like, has retained all of the advantages of plastic material. Specifically, the junction between the metal primary yoke and the plastic secondary yoke is quiet and substantially friction free. That is, the metal on plastic contact will not generate any noises as the direction of the blade is reversed on the windshield. The metal on plastic contact is substantially friction free thereby eliminating resistance or binding between the relatively articulating yokes during movement of the blade from a substantially flat surface to a curved surface and back again. The secondary yoke being made of plastic material also will slide freely and quietly on the backing strip where the plastic claws of the secondary yoke slidably engage with the edges of the metal backing strip.

Therefore, the combination of a metal primary yoke and plastic secondary yoke slidably engaging with a metal backing strip produces an improved wiper blade that not only operates in a quieter fashion but also articulates more freely in the plane perpendicular to a windshield so as to conform more readily to the surface being wiped. Due to the lower resistance between the yokes and between the yoke and the blade, more pressure from the wiper arm is transmitted to the backing strip to urge the wiping edge into wiping contact with the windshield.

We claim:

1. In a wiper for cleaning a windshield comprising a pressure distributing superstructure, a resilient wiping member, a flexible backing strip operatively associated with said wiping member, and a pair of spaced apart abutments carried by said wiping member, said superstructure having in combination a primary yoke and a secondary yoke, said secondary yoke being formed of plastic material and being in slidable engagement with the backing strip outboard of one of said abutments, said primary yoke being formed of metal material and having inturned means on at least one end portion thereof, said plastic secondary yoke having an entry portion intermediate the ends thereof, means projecting from said intermediate portion of said secondary yoke inboard of said entry portion, said inturned means of said primary yoke pivotally engaging with said projecting means of the secondary yoke, stop means on said secondary yoke inboard of said projecting means and engaged by said inturned means of said primary yoke as the inboard claw means on said secondary yoke is urged in an outboard direction by said abutment means on said wiping member for holding said superstructure firmly on said wiping member and backing strip.

2. The wiper of claim 1 wherein said projecting means on said secondary yoke is a pair of overhanging edge portions and said stop means is a projection located adjacent the inboard end of each of said edge portions.

3. A wiper for cleaning a windshield comprising a pressure distributing superstructure operatively connected to a flexible backing strip carried by a resilient wiping member, a pair of abutments carried by said wiping member and positioned in spaced apart relationship thereon, said superstructure having at least one secondary yoke and a primary yoke, said secondary yoke being formed of a plastic material and having means slidably engaging with one end portion of said backing strip outboard of one of said abutments, at least one of said secondary yokes having aligned indented portions formed intermediate the ends thereof, sidewardly projecting means formed inboard of said indented portions, stop means carried by said secondary yoke inboard of said projecting means, said primary yoke being formed of metal material and being pivotally connected to one of said secondary yokes and having means on the other end portion which pass through said indented portion and pivotally engage with said porjecting means and abut against said stop means, said abutments on said wiping blade positioning said plastic secondary yokes outboard relative to said metal primary yoke to hold the means on said metal primary yoke assembled with the projecting means on said plastic secondary yoke whereby the superstructure is held assembled on the blade 4. In a wiper for cleaning a windshield comprising a pressure distributing superstructure, a wiper blade element having a resilient wiping member, a flexible backing strip operatively associated with said wiping member, a pair of spaced apart abutments carried by said wiping member, said superstructure having in combination a metal primary yoke and a pair of plastic secondary yokes, said plastic secondary yokes having means on the end portions thereof slidably engaging with the backing strip outboard of said abutments, one end portion of said metal primary yoke having a pair of inturned means spaced apart from each other, at least one of said plastic secondary yokes having an entry portion intermediate the ends thereof and through which entry portion the inturned means on the metal primary yoke pass, and means inboard of said entry portion and projecting outwardly from the sides of said plastic secondary yoke in position to be pivotally engaged by the inturned means of said metal primary yoke as said inturned means are moved inboard from the entry portion.

* * * * *